United States Patent
Lee et al.

(10) Patent No.: US 10,015,765 B2
(45) Date of Patent: Jul. 3, 2018

(54) METHOD AND APPARATUS FOR INDICATING CHANGE OF COVERAGE ENHANCEMENT MODE IN WIRELESS COMMUNICATION SYSTEM

(71) Applicant: LG ELECTRONICS INC., Seoul (KR)

(72) Inventors: Jaewook Lee, Seoul (KR); Youngdae Lee, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/112,994

(22) PCT Filed: Feb. 10, 2015

(86) PCT No.: PCT/KR2015/001307
§ 371 (c)(1),
(2) Date: Jul. 20, 2016

(87) PCT Pub. No.: WO2015/122665
PCT Pub. Date: Aug. 20, 2015

(65) Prior Publication Data
US 2017/0006572 A1     Jan. 5, 2017

Related U.S. Application Data

(60) Provisional application No. 61/938,634, filed on Feb. 11, 2014.

(51) Int. Cl.
*H04W 60/04* (2009.01)
*H04W 60/06* (2009.01)
*H04W 16/26* (2009.01)

(52) U.S. Cl.
CPC .......... *H04W 60/04* (2013.01); *H04W 60/06* (2013.01); *H04W 16/26* (2013.01)

(58) Field of Classification Search
CPC .................................................. H04W 60/04
See application file for complete search history.

(56) References Cited

U.S. PATENT DOCUMENTS 8,615,241 B2 * 12/2013 Gupta ............... H04W 36/0011
455/437
2011/0249558 A1 * 10/2011 Raaf .................... H04W 24/02
370/237

(Continued)

OTHER PUBLICATIONS

Huawei et al., "Considerations on PRACH repetition levels and power adjustment of PRACH transmission", 3GPP TSG RAN WG1 Meeting #76, R1-140026, Feb. 1, 2014, 6 pages.

(Continued)

*Primary Examiner* — Gerald A Smarth
(74) *Attorney, Agent, or Firm* — Lee Hong Degerman Kang Waimey

(57) ABSTRACT

A method and apparatus for indicating change of a coverage enhancement (CE) mode in a wireless communication system is provided. A CE mode for coverage enhancement may be defined. A user equipment (UE) determines whether the CE mode changes. If it is determined that the CE mode changes, the UE detaches with a network, and re-attaches with the network based on the changed CE mode.

13 Claims, 5 Drawing Sheets

(56) References Cited

U.S. PATENT DOCUMENTS

2013/0010768 A1    1/2013   Lee et al.
2014/0098761 A1*   4/2014   Lee .................... H04W 74/006
                                                                        370/329
2014/0133465 A1*   5/2014   Johansson ............ H04W 24/04
                                                                        370/332

OTHER PUBLICATIONS

LG Electronics, "Initial procedure and consideration points for the coverage enhancement of MTC UEs", 3GPP TSG RAN WG1 #74, R1-133370, Aug. 10, 2013, 5 pages.
MediaTek Inc., "Discussion on CSI report in coverage enhancement", 3GPP TSG-RAN WG1 #76, R1-140241, Feb. 1, 2014, 3 pages.
Alcatel-Lucent et al., "Coverage enhancement mode operation", 3GPP TSG-RAN WG2 Meeting #85, R2-140728, Feb. 1, 2014, 2 pages.

* cited by examiner

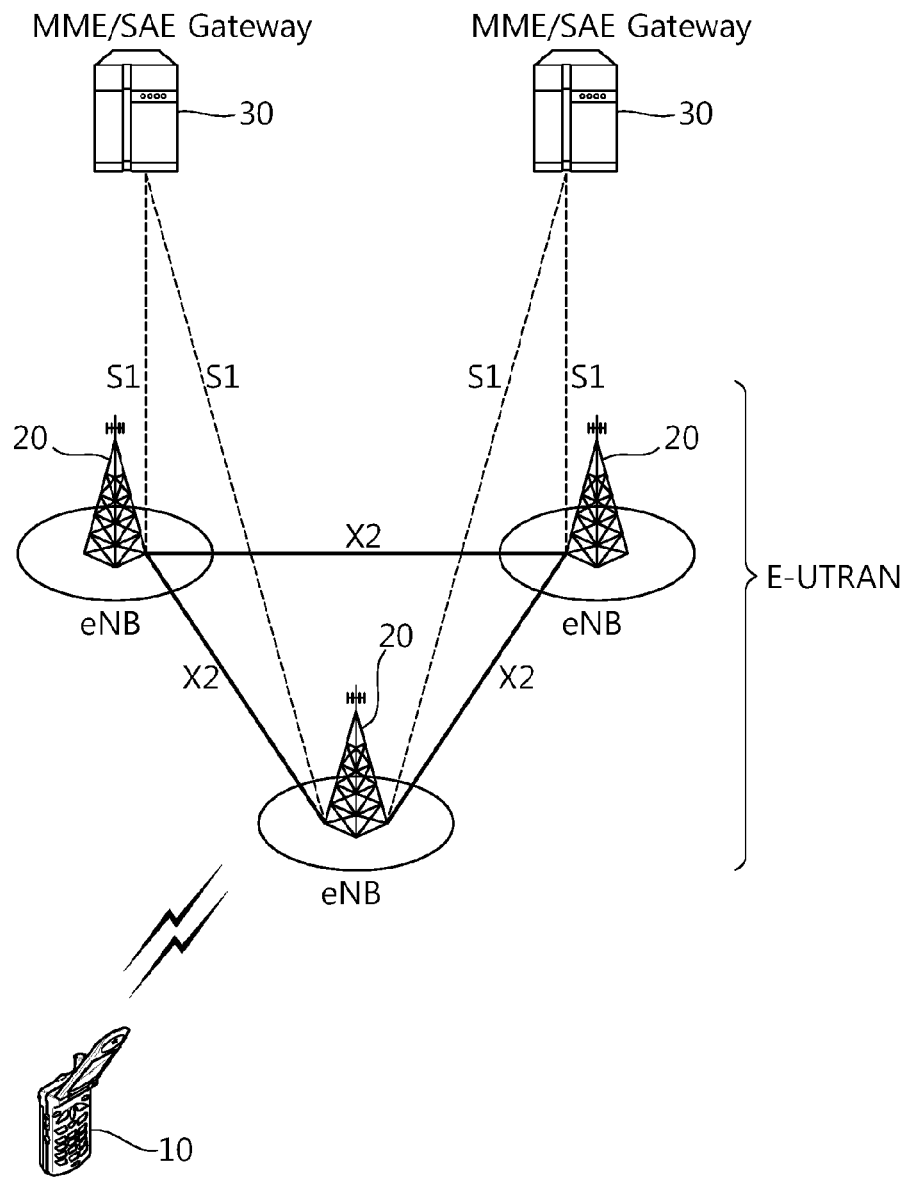
[Fig. 1]

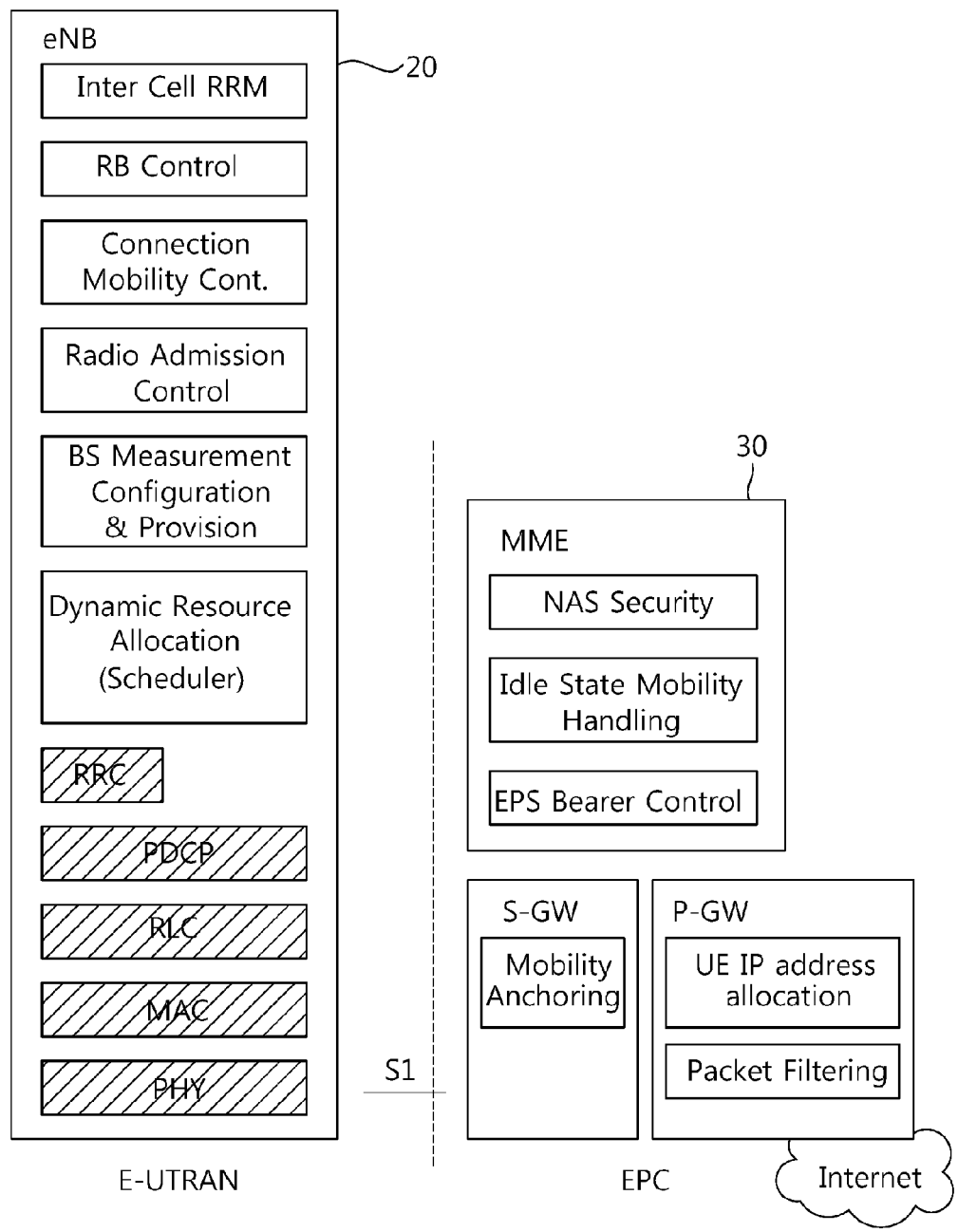
[Fig. 2]

[Fig. 3]
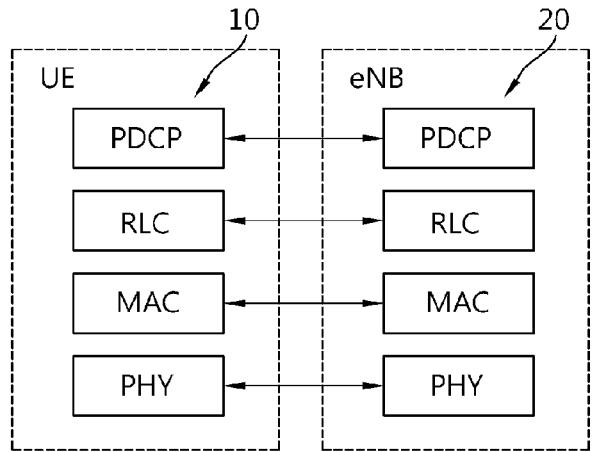
[Fig. 4]
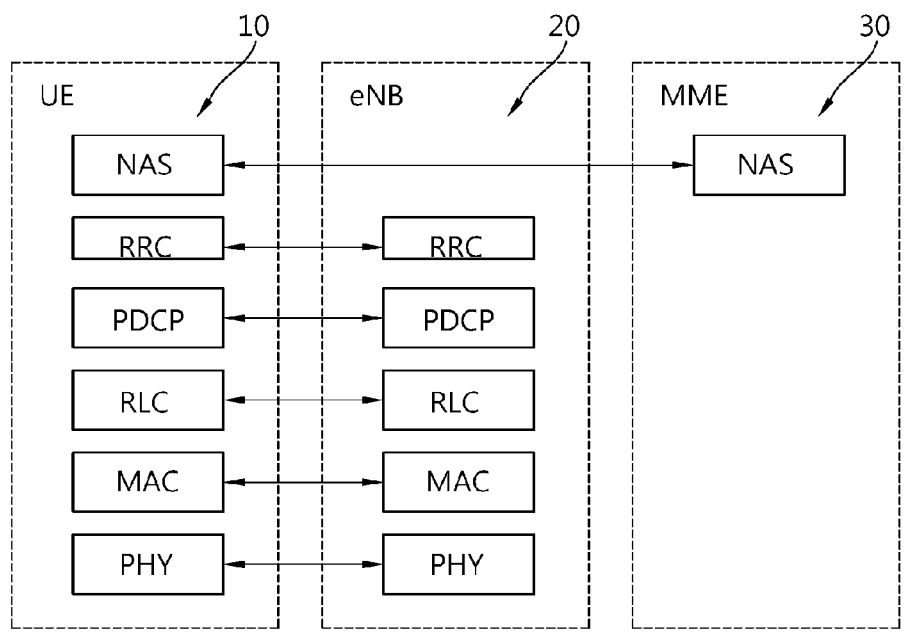
[Fig. 5]
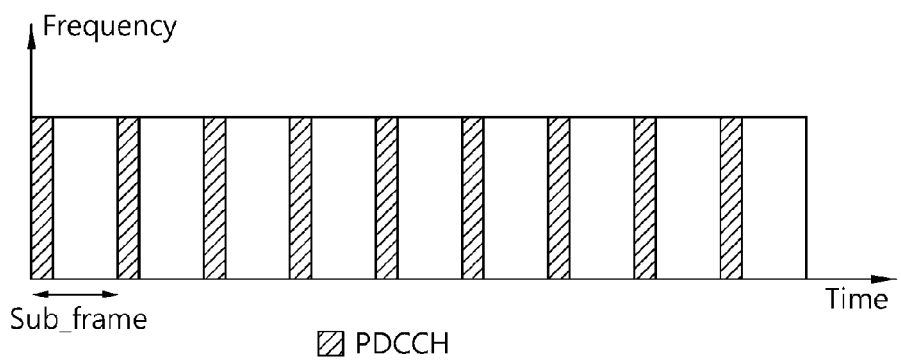

[Fig. 6]
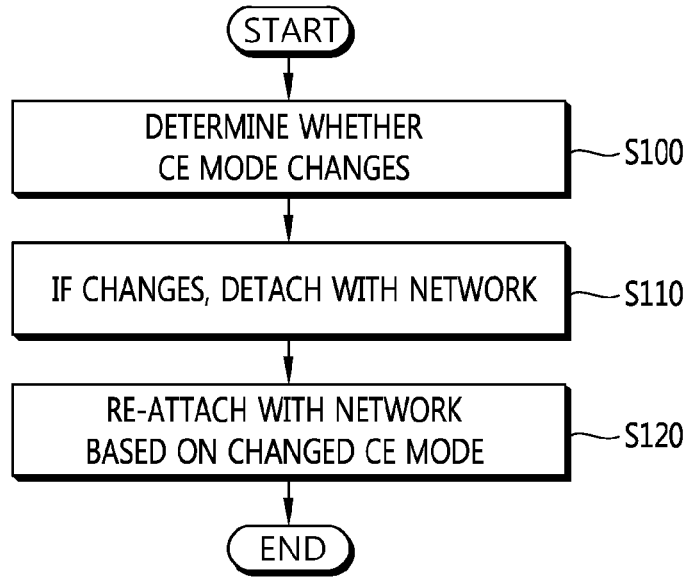
[Fig. 7]
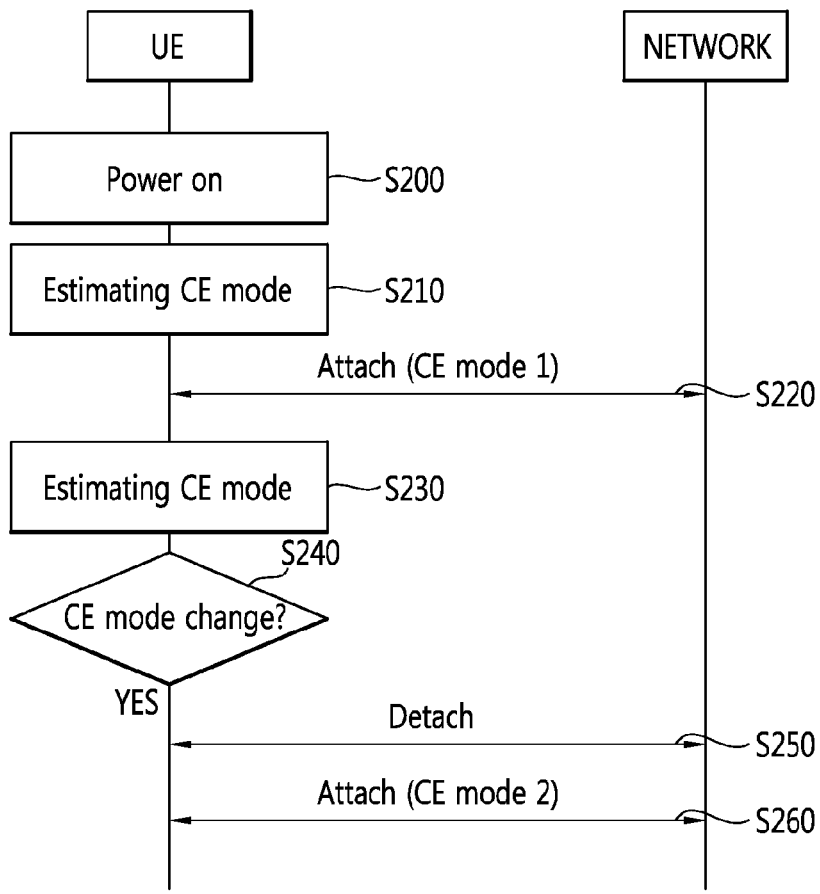

[Fig. 8]
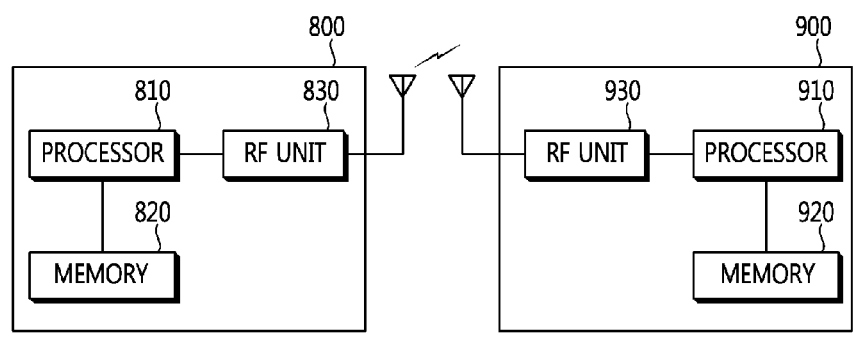

METHOD AND APPARATUS FOR INDICATING CHANGE OF COVERAGE ENHANCEMENT MODE IN WIRELESS COMMUNICATION SYSTEM

CROSS-REFERENCE TO RELATED APPLICATIONS

This application is the National Stage filing under 35 U.S.C. 371 of International Application No. PCT/KR2015/001307, filed on Feb. 10, 2015, which claims the benefit of U.S. Provisional Application No. 61/938,634, filed on Feb. 11, 2014, the contents of which are all hereby incorporated by reference herein in their entirety.

BACKGROUND OF THE INVENTION

Field of the Invention

The present invention relates to wireless communications, and more particularly, to a method and apparatus for indicating change of a coverage enhancement (CE) mode in a wireless communication system.

Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Machine-type communication (MTC) is an important revenue stream for operators and has a huge potential from the operator perspective. There are several industry for a working on an efficient machine-to-machine (M2M) system with some industry members developing a new access technology dedicated for MTC. However, it is more efficient for operators to be able to serve MTC user equipment (UE) using already deployed radio access technology. Therefore it is important for operators to understand whether LTE could be a competitive radio access technology for efficient support of MTC. It is envisaged that MTC UE's will be deployed in huge numbers, large enough to create an eco-system on its own. Lowering the cost of MTC UE's is an important enabler for implementation of the concept of "internet of things". MTC UE's used for many applications will require low operational power consumption and are expected to communicate with infrequent small burst transmissions.

In addition, there is a substantial market for the M2M use cases of devices deployed deep inside buildings which would require coverage enhancement in comparison to the defined LTE cell coverage footprint.

Some MTC UEs may be installed in the basements of residential buildings or locations shielded by foil-backed insulation, metallized windows or traditional thick-walled building construction. These MTC UEs may experience significantly greater penetration losses on the radio interface than normal LTE UEs. Thus, for these MTC UEs, coverage enhancement may be required. The MTC UEs in the extreme coverage scenario may have characteristics such as very low data rate, greater delay tolerance, and no mobility, and therefore, some messages/channels may not be required.

According to situation, coverage enhancement may be changed. In this case, a method for indicating change of a coverage enhancement mode may be required.

SUMMARY OF THE INVENTION

The present invention provides a method and apparatus for indicating change of a coverage enhancement (CE) mode in a wireless communication system. The present invention provides a method for performing user equipment (UE)-initiated detaching and re-attaching if the CE mode changes.

In an aspect, a method for indicating, by a user equipment (UE), change of a coverage enhancement (CE) mode in a wireless communication system is provided. The method includes determining, by the UE, whether the CE mode changes, if it is determined that the CE mode changes, detaching, by the UE, with a network, and re-attaching, by the UE, with the network based on the changed CE mode.

In another aspect, a user equipment (UE) configured to indicate change of a coverage enhancement (CE) mode in a wireless communication system is provided. The UE includes a radio frequency (RF) unit configured to transmit or receive a radio signal, and a processor coupled to the RF unit, and configured to determine whether the CE mode changes, if it is determined that the CE mode changes, detach with a network, and re-attach with the network based on the changed CE mode.

Unnecessary repetition of messages for coverage enhancement can be avoided.

BRIEF DESCRIPTION OF THE DRAWINGS

FIG. 1 shows LTE system architecture.

FIG. 2 shows a block diagram of architecture of a typical E-UTRAN and a typical EPC.

FIG. 3 shows a block diagram of a user plane protocol stack of an LTE system.

FIG. 4 shows a block diagram of a control plane protocol stack of an LTE system.

FIG. 5 shows an example of a physical channel structure.

FIG. 6 shows an example of a method for indicating change of a CE mode according to an embodiment of the present invention.

FIG. 7 shows another example of a method for indicating change of a CE mode according to an embodiment of the present invention.

FIG. 8 shows a wireless communication system to implement an embodiment of the present invention.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e. between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Low-cost machine-type communications (MTC) UEs are described. It may be referred to Section 5 of 3GPP TR 36.888 V12.0.0 (2013-06). Solutions studied for provisioning of low-cost MTC UE based on LTE should support below as a minimum requirement.

Support data rates equivalent to that supported by [R'99 E-GPRS] with an EGPRS multi-slot class 2 device (2 downlink timeslots (118.4 Kbps), 1 uplink timeslots (59.2 Kbps), and a maximum of 3 active timeslots) as a minimum. This does not preclude the support of higher data rates provided the cost targets are not compromised.

Enable significantly improved average spectrum efficiency for low data rate MTC traffic compared to that achieved for R99 GSM/EGPRS terminals in GSM/EGPRS networks today, and ideally comparable with that of LTE. Optimizations for low-cost MTC UEs should minimize impact on the spectrum efficiency achievable for other terminals (normal LTE terminals) in LTE Release 8-10 networks.

Ensure that service coverage footprint of low-cost MTC UE based on LTE is not any worse than the service coverage footprint of GSM/EGPRS MTC device (in an GSM/EGPRS network) or that of "normal LTE UEs" (in an LTE network) assuming on the same spectrum band.

Coverage improvement of 20 dB should be targeted for low-cost MTC UEs in comparison to defined LTE cell coverage footprint as engineered for "normal LTE UEs".

Ensure that overall power consumption is no worse than existing GSM/GPRS based MTC devices.

Ensure good radio frequency coexistence with legacy (Release 8-10) LTE radio interface and networks.

Target operation of low-cost MTC UEs and legacy LTE UEs on the same carrier.

Re-use the existing LTE/SAE network architecture.

Solutions should be specified in terms of changes to the Rel 10 version of the specifications The study item shall consider optimizations for both frequency division duplex (FDD) and time division duplex (TDD) mode.

The initial phase of the study shall focus on solutions that do not necessarily require changes to the LTE base station hardware.

Low-cost MTC device support limited mobility (i.e., no support of seamless handover; ability to operate in networks in different countries) and are low power consumption modules.

Coverage enhancement for low-cost MTC UEs is described. It may be referred to Section 9 of 3GPP TR 36.888 V12.0.0 (2013-06). Performance evaluation of coverage enhancement techniques may be analyzed in terms of coverage, power consumption, cell spectral efficiency, specification impacts and, cost or complexity analysis. Not all UEs will require coverage enhancement, or require it to the same amount. It may be possible to enable the techniques only for the UEs that need it.

For coverage analysis, an additional coverage requirement of a 20 dB enhancement in comparison to "category 1 UEs" is targeted. Table 1 shows a minimum couple loss (MCL) table for category 1 UEs.

TABLE 1

| | Physical channel name | | | | | | |
|---|---|---|---|---|---|---|---|
| | PUCCH (1A) | PRACH | PUSCH | PDSCH | PBCH | SCH | PDCCH (1A) |
| MCL (FDD) | 147.2 | 141.7 | 140.7 | 145.4 | 149.0 | 149.3 | 146.1 |
| MCL (TDD) | 149.4 | 146.7 | 147.4 | 148.1 | 149.0 | 149.3 | 146.9 |

Referring to Table 1, it can be expected when the amount of coverage enhancement becomes larger, all channels listed in Table 1 need to be improved. For example, if the amount equals 20 dB, all uplink and downlink channels need to be enhanced because the gap between maximum MCL and minimum MCL is 8.6 dB for FDD and 2.7 dB for TDD. Given that single receive radio frequency (RF) and bandwidth reduction may be used for MTC UEs, and these techniques would decrease downlink coverage, additional coverage enhancement needs to be considered to compensate this coverage loss.

Assuming an x dB coverage enhancement is desired, the limiting channel from Table 1 with the minimum MCL will need to be improved by x dB. Note that x dB coverage enhancement is with respect to category 1 UE at the data rate of 20 kbps. The other channels will require less enhancement, with the overall amount of compensation equal to x dB reduced by the difference between the MCL and the minimum MCL. The overall amount of compensation should also include the application of low-cost MTC techniques: single receive RF chain would require additional coverage compensation for all downlink channels, and reduction of maximum bandwidth may require additional coverage compensation for the (E)PDCCH and physical downlink shared channel (PDSCH).

Required system functionality for MTC UEs in coverage enhancement mode is assumed to include functionality needed for synchronization, cell search, power control, random access procedure, channel estimation, measurement reporting and DL/UL data transmission (including DL/UL resource allocation). A MTC user who moves around is unlikely to be out of coverage for long. Accordingly, target of coverage enhancement is primarily for delay tolerant low-cost MTC device which are not mobile. System functionality requirement for large delay tolerant MTC UE requiring enhanced coverage may be relaxed or simplified in comparison to that required by normal LTE UE. HARQ acknowledgement (ACK)/non-acknowledgement (NACK) for PUSCH transmission is carried by physical HARQ indicator channel (PHICH). Dependent on the technique(s) for coverage enhancement PHICH may or may not be required. Control format indicator (CFI) in physical control format indicator channel (PCFICH) is transmitted in each subframe and indicates the number of OFDM symbols used for transmission of control channel information. With some additional complexity in UE (e.g. decoding of control channel assuming different CFI) or higher-layer signaling (e.g. pre-configuration of CFI), PCFICH may be eliminated.

Various concepts for coverage enhancement are described.

More energy can be accumulated to enhance coverage by prolonging transmission time. The existing transmission time interval (TTI) bundling and HARQ retransmission in data channel can be helpful. Note that since the current maximum number of UL HARQ retransmission is 28 and TTI bundling is up to 4 consecutive subframes, TTI bundling with larger TTI bundle size may be considered and the maximum number of HARQ retransmissions may be extended to achieve better performance. Other than TTI bundling and HARQ retransmission, repetition can be applied by repeating the same or different redundant version (RV) multiple times. In addition, code spreading in the time domain can also be considered to enhance coverage. MTC traffic packets could be RLC segmented into smaller packets. Very low rate coding, lower modulation order (binary phase shift keying (BPSK)) and shorter length cyclic redundancy check (CRC) may also be used. New decoding techniques (e.g. correlation or reduced search space decoding) can be used to enhance coverage by taking into account the characteristics of the particular channels (e.g., channel periodicity, rate of parameter changes, channel structure, limited content, etc.) and the relaxed performance requirements (e.g. delay tolerance).

More power can be used by the eNB on the DL transmission to a MTC UE (i.e. power boosting), or a given level of power can be concentrated into a reduced bandwidth at the eNB or the UE (i.e. power spectral density (PSD) boosting). The application of power boosting or PSD boosting will depend on the channel or signal under consideration.

The performance requirements for some channels can be relaxed considering the characteristics (e.g. greater delay tolerance) of MTC UEs at extreme scenarios. For the synchronization signal, MTC UEs can accumulate energy by combining primary synchronization signal (PSS) or secondary synchronization signal (SSS) multiple times, but this will prolong acquisition time. For physical random access channel (PRACH), a loosened PRACH detection threshold rate and a higher false alarm rate at eNB could be considered.

New design of channels or signals for better coverage is possible if implementation based schemes cannot meet coverage enhancement requirement. These channels and signals, together with other possible link-level solution for coverage enhancement, are summarized in Table 2.

TABLE 2

|  | PSS/SSS | PBCH | PRACH | (E)PDCCH | PDSCH/PUSCH | PUCCH |
|---|---|---|---|---|---|---|
| PSD boosting | x | x | x | x | x |  |
| Relaxed requirement | x |  | x |  |  |  |
| Design new channels/signals | x | x | x | x | x |  |
| Repetition |  | x | x | x | x | x |
| Low rate coding |  | x |  | x | x | x |
| TTI bundling/Retransmission |  |  |  |  | x |  |
| Spreading |  | x |  |  | x |  |
| RS power boosting/increased RS density |  | x |  | x | x |  |
| New decoding techniques |  | x |  |  |  |  |

Coverage enhancements using link improvements must be provided for scenarios where no small cells have been deployed by the operator. An operator may deploy traditional coverage improvement solutions using small cells (including pico, femto, remote radio head (RRH), relays, repeaters, etc.) to provide coverage enhancements to MTC and non-MTC UE's alike. In deployments with small cells, the path loss from the device to the closest cell is reduced. As a result, for MTC UEs, the required link budget can be reduced for all channels.

For deployments that already contain small cells, there may be a benefit to further allow decoupled UL and DL for delay tolerant MTC UEs. For UL, the best serving cell is chosen based on the least coupling loss. For DL, due to the large Tx power imbalance (including antenna gains) between the macro and lower power node (LPN), the best serving cell is the one with maximum received signal power. This UL/DL decoupled association is feasible for MTC traffic especially for services without tight delay requirements. To enable UL/DL decoupled operation either in a UE-transparent or non-transparent manner, macro serving cell and potential LPNs may need to exchange information for channel (e.g. RACH, PUSCH, sounding reference signal (SRS)) configurations and to identify the suitable LPN. A different RACH configuration may be needed with decoupled UL/DL, from that without decoupled UL/DL.

Existing solutions that are deployed for coverage enhancement for "normal LTE UE" such as directional antennas, and external antennas can enhance coverage for MTC UE and normal UE alike.

As described above, repetition of each message may be considered as the basic method for coverage enhancement. Due to change of radio channel or movement of the UE, whether the coverage enhancement is required for the UE may be changed. For instance, if the UE is moved from the basement to the ground, the UE is likely to have better radio channel, and accordingly, the UE may no longer require the repetition. However, this change of coverage enhancement is unlikely known to the network so that the unnecessary repetition for the UE may happen.

In order to solve the problem describe above, a method for indicating change of a coverage enhancement (CE) mode according to an embodiment of the present invention is described below. According to an embodiment of the present invention, the CE mode is newly defined, and the UE determines whether the CE mode changes. If the CE mode changes, the UE performs UE-initiated detaching and re-attaching with the changed CE mode if the CE mode changes. Accordingly, the network may know whether the coverage enhancement scheme is required or not for the UE in RRC_IDLE.

FIG. 6 shows an example of a method for indicating change of a CE mode according to an embodiment of the present invention. The CE mode may be defined by whether the UE is required to perform repetition for successful UL transmission and/or DL reception. For example, CE mode 0 may indicate the repetition is not needed, and CE mode 1 may indicate the repetition is needed. Alternatively, the CE mode may be defined by the amount of repetition (or, a number of resource blocks, a number of subframes) required for successful UL transmission and/or DL reception. For example, CE mode 0 indicates that the repetition is not needed, CE mode 1 indicates that the repetition is needed by some amount, CE mode 2 indicates that the repetition is needed by more amount than the amount needed for CE mode 1, and so on. The UE may transmit information on the CE mode when the UE performs the RRC connection procedure, attach procedure or tracking area update (TAU) procedure. Further, the information on the CE mode may be mapped to code points or bits.

Referring to FIG. 6, in step S100, the UE determines whether the CE mode changes. The change of the CE mode may indicate that the UE which has performed coverage enhancement does not need to perform coverage enhancement any more. Alternatively, the change of the CE mode may indicate that the UE which has not performed coverage enhancement needs to perform coverage enhancement. Alternatively, the change of the CE mode may indicate that the required/expected amount of repetition (or, a number of resource blocks, a number of subframes) for coverage enhancement changes (e.g. less or more amount of repetition/resource blocks/subframes is needed compared to the amount required for the last successful transmission/reception). Furthermore, once RRC connection is successfully established, the UE may maintain the same CE mode during the established RRC connection.

The UE may determine its CE mode based on various factors. First, the UE may determine its CE mode based on the radio channel condition, such as referenced signal received power (RSRP) and/or referenced signal received quality (RSRQ). In this case, the measured signal level may be compared with the threshold signaled by the network. For example, if RSRP (or RSRQ)<CE_low, coverage enhancement may be required, and if RSRP (or RSRQ)>CE_low, coverage enhancement may not be required. When multiple levels for the CE mode are defined, if RSRP (or RSRQ) <CE_thresh0, coverage enhancement with CE mode 0 may be required, if CE_thresh0≤RSRP (or RSRQ)<CE_thresh1, coverage enhancement with CE mode 1 may be required, and so on.

Alternatively, the UE may determine its CE mode based on essential system information acquisition period. If the UE cannot acquire essential system information for period T_sys, coverage enhancement may be required. Alternatively, if the UE performs N times trial of acquisition of essential system information but the UE cannot acquire, coverage enhancement may be required.

Alternatively, the UE may determine its CE mode based on the number of repetition required for successfully receiving system information (e.g. master information block (MIB), system information block type1 (SIB1), SIB2 . . . ). For example, if the number of repetition required for receiving the essential system information is 1, coverage enhancement may not be required. If 1<the number of repetition required<thresh1, coverage enhancement with CE mode 1 may be required. If thresh1<the number of repetition required<thresh2, coverage enhancement with CE mode 2 may be required, and so on.

Alternatively, the UE may determine its CE mode based on synchronization channel acquisition, i.e. primary synchronization signal (PSS)/secondary synchronization signal (SSS). As similar as the CE mode determination method by using the system information described above, UE may determine its CE mode based on the number of repetition required for detecting PSS/SSS. Or, if the UE cannot acquire synchronization channel successfully for period T_sys, coverage enhancement may be required.

Back to FIG. 6, in step S110, if it is determined that the CE mode changes, the UE detaches with the network. In step S120, the UE re-attaches with the network based on the changed CE mode. During the re-attach procedure, the UE may include information on the changed CE mode in the attach request message. Accordingly, the network can know the CE mode of the UE.

Alternatively, during step S110 and S120, if it is determined by the AS layer that the CE mode changes, the AS layer may inform the NAS layer of the changed CE mode. Accordingly, the NAS layer may be always informed of the up-to-date CE mode of the UE by the AS layer. The NAS layer may store the up-to-date CE mode and trigger the RRC connection procedure involving random access procedure. Or, the AS layer itself may initiate the RRC connection procedure. The UE may try RRC connection establishment procedure (including random access procedure) using the changed CE mode. And after establishing RRC connection, the UE may notify the changed CE mode to the eNB, and the eNB may notify the change CE mode to the MME.

Alternatively, during step S110 and S120, if it is determined by the AS layer that the CE mode changes, the AS layer may inform the NAS layer of the changed CE mode. Accordingly, the NAS layer may be always informed of the up-to-date CE mode of the UE by the AS layer. If the stored CE mode is different from the informed CE mode from the AS layer, the NAS layer may store the informed CE mode and trigger the TAU procedure. During the TAU procedure, the UE may include the changed CE mode in the TAU request message so that the core network (i.e. MME) knows the up-to-date CE mode of the UE. And, the NAS layer may inform the AS layer so that the AS layer can perform RRC connection establishment procedure using the up-to-date CE mode.

FIG. 7 shows another example of a method for indicating change of a CE mode according to an embodiment of the present invention. In step S200, the UE turns the power on. In step S210, the UE estimates the CE mode, and it is assumed that coverage enhancement with CE mode 1 is required. Accordingly, in step S220, the UE attaches with the network based on CE mode 1. During the attach procedure, information on CE mode 1 may be transmitted to the network. In step S230, the UE estimates the CE mode again, and in step S240, the UE determines whether the CE mode changes during being attached. It is assumed that the CE mode changes from CE mode 1 to CE mode 2. Accordingly, in step S250, the UE-initiated detach procedure is triggered and the UE performs detach procedure. In step S260, the UE re-attaches with the network based on the changed CE mode, i.e. CE mode 2. During the re-attach procedure, information on CE mode 2 may be transmitted to the network. Accordingly, the network is able to know the CE mode of the UE.

FIG. 8 shows a wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for indicating, by a user equipment (UE), change of a coverage enhancement (CE) mode in a wireless communication system, the method comprising:
   determining, by the UE, whether the CE mode changes;
   if it is determined that the CE mode changes, detaching, by the UE, with a network;
   re-attaching, by the UE, with the network based on the changed CE mode; and
   transmitting information on the changed CE mode to the network during the re-attach procedure,
   wherein the information on the changed CE mode is transmitted via an attach request message.

2. The method of claim 1, wherein the CE mode is defined by whether the UE is require to perform repetition for uplink (UL) transmission or downlink (DL) reception for coverage enhancement.

3. The method of claim 1, wherein the CE mode is defined by amount of repetitions required for successful UL transmission or DL reception for coverage enhancement.

4. The method of claim 1, wherein change of the CE mode indicates that the UE which has performed coverage enhancement does not need to perform coverage enhancement any more.

5. The method of claim 1, wherein change of the CE mode indicates that the UE which has not performed coverage enhancement needs to perform coverage enhancement.

6. The method of claim 1, wherein change of the CE mode indicates that required amount of repetitions for coverage enhancement changes.

7. The method of claim 1, wherein the CE mode is determined based on radio channel condition, which is compared with a threshold signaled by the network.

8. The method of claim 1, wherein the CE mode is determined based on system information acquisition period or a number of repetitions for acquiring system information.

9. The method of claim 1, wherein the CE mode is determined based on synchronization signal acquisition period or a number of repetitions for acquiring a synchronization signal.

10. The method of claim 1, wherein the information on the changed CE mode is mapped to code points or bits.

11. A user equipment (UE) configured to indicate change of a coverage enhancement (CE) mode in a wireless communication system, the UE comprising:
    a radio frequency (RF) unit configured to transmit or receive a radio signal; and
    a processor coupled to the RF unit, and configured to:
       determine whether the CE mode changes;
       if it is determined that the CE mode changes, detach with a network;
       re-attach with the network based on the changed CE mode; and
       transmit information on the changed CE mode to the network during the re-attach procedure,
       wherein the information on the changed CE mode is transmitted via an attach request message.

12. The UE of claim 11, wherein the CE mode is defined by whether the UE is require to perform repetition for uplink (UL) transmission or downlink (DL) reception for coverage enhancement.

13. The UE of claim 11, wherein the CE mode is defined by amount of repetitions required for successful UL transmission or DL reception for coverage enhancement.

* * * * *